Sept. 11, 1923. 1,467,514
R. STEPHENS ET AL
DRUM BRAKE
Filed Feb. 16, 1921 2 Sheets-Sheet 1

INVENTORS:
Richard Stephens
Richard John Stephens
Arthur Edwart Stephens
by their attorney
James Hamilton Sept. 11, 1923.

R. STEPHENS ET AL

DRUM BRAKE

Filed Feb. 16, 1921

Patented Sept. 11, 1923.

1,467,514

UNITED STATES PATENT OFFICE.

RICHARD STEPHENS, RICHARD JOHN STEPHENS, AND ARTHUR EWART STEPHENS, OF UPPER NORWOOD, LONDON, ENGLAND.

DRUM BRAKE.

Application filed February 16, 1921. Serial No. 445,547.

*To all whom it may concern:*

Be it known that we, RICHARD STEPHENS, RICHARD JOHN STEPHENS, ARTHUR EWART STEPHENS, all subjects of the King of Great Britain, and residing at 63 Church Road, Upper Norwood, London, S. E. 19, England, have invented certain new and useful Improvements in Drum Brakes, of which the following is a specification.

This invention relates to drum brakes for use on motor vehicles and for other purposes and has for its subject the construction of brake shoes from T-section steel for use in such brakes.

Various forms of constructions of brake shoes are shown in the accompanying drawings, wherein.

Figure 1:
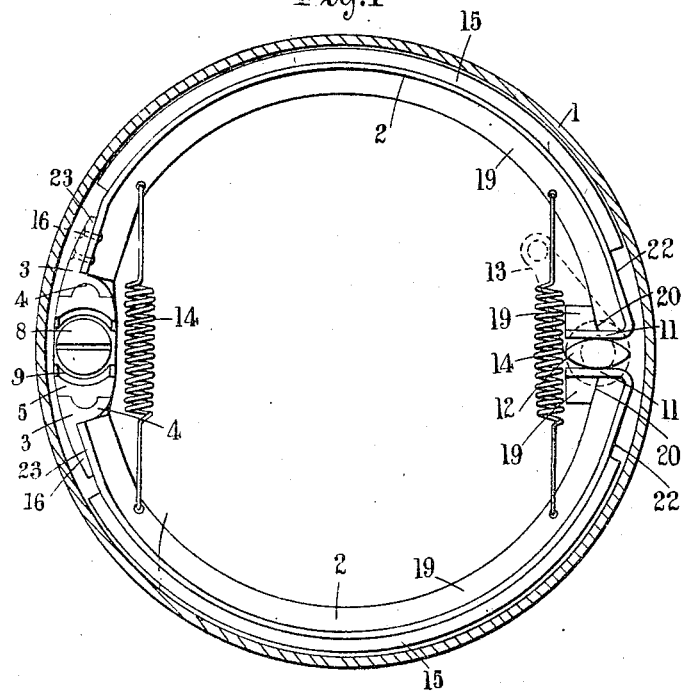
Figure 1 shows a face view of a brake drum provided with a pair of shoes, the drum being shown in section.
Figure 2:
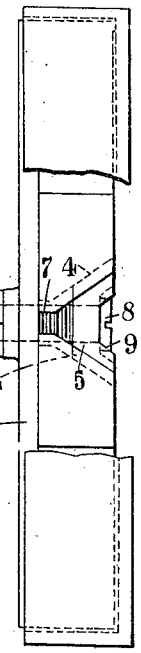
Figure 2 shows a view of the left-hand end of Figure 1 with the drum partly broken away.

Inside a drum 1 are mounted a pair of brake shoes 2 made from T-section steel. To one end of each brake shoe 2 is secured in any suitable manner, for example, by riveting welding or brazing a member 3 provided with an inclined recess at 4. Into the inclined recesses of the shoes is adapted to engage a wedge block 5. This block is adapted to be drawn towards the plate 6 carrying the brake mechanism by means of a bolt 7 of which the head 8 fits into a recess at 9 in the block 5. The bolt 7 is screwed into the plate 6 by turning the flattened end 24 thereof and is locked in position by a nut 10.

At the other end each of the shoes 2 is turned back so as to form a bearing surface at 11, and between the bearing surfaces 11 is adapted to work a cam 12 operated by a lever 13 shown in dotted lines in Figure 1.

The two brake shoes 2 are drawn together by springs 14 and are each fitted with a lining 15 of suitable friction material. As is well known such friction material wears away in time and in order to take up the wear thereof the members 3 of the shoes 2 are adapted to be spread apart. For this purpose the bolt 7 is screwed into the plate 6 and locked in position by means of the nut 10 thus causing the wedge block 5 to be moved towards the plate 6 and spread the ends 3 of the brake shoes. The lining 15 is brought into contact with the interior of the drum 1 for braking purposes by turning the cam 12 through the medium of the lever 13.

Figure 3:
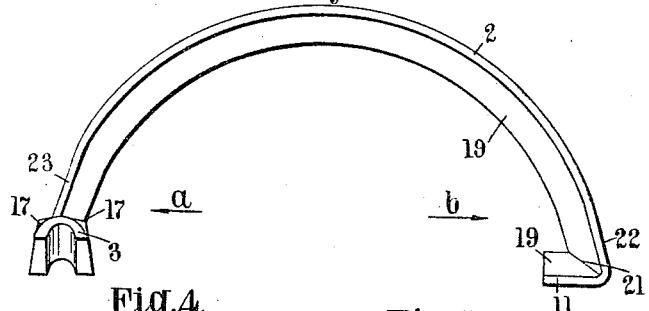
Figure 3 shows a modified form of brake shoe.
Figure 4:
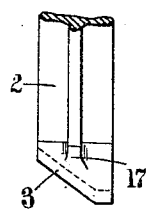
Figure 4 is an end view looking in the direction of the arrow *a*, Figure 3.
Figure 5:
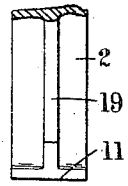
Figure 5 is an end view looking in the direction of the arrow *b*, Figure 3.
Figure 6:
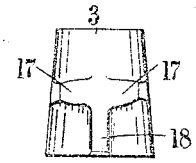
Figures 6, 7 and 8 are detail views.
Figure 7:
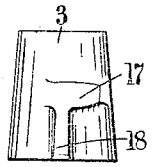
Figure 8:
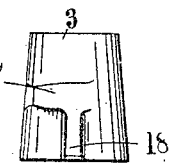

Instead of providing the member 3 with an extension 16, for riveting purposes as shown in Figure 1, it may simply be provided with a projection 17 and a flat surface at 18 (Figures 6–8) so that it may be welded to the end of the shoe 2 of T-section as shown in Figures 3 and 4. For the companion shoe the projection 17 would be arranged as shown in Figure 7. If the member 3 is to be constructed so as to be applicable to both shoes two projections 17 would be provided as shown in Figure 6, so that in addition to the flat portion 18 one or other of the projections 17 would be welded to the shoe, as shown in Figure 3. The member 3 is preferably made of mild steel.

Figure 9:
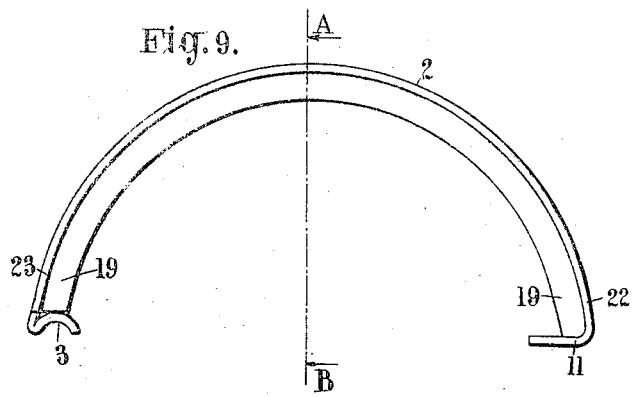
Figure 9 shows another modified form of brake shoe.

The member 3 may also be formed integral with the shoe 2 as shown in Figure 9 by removing a portion of the inwardly turned rib 19 and bending the member to the required shape. The curved portion of the member 3 will then bear against the rib 19 in order to obtain the necessary support.

Figure 10:
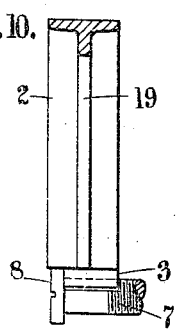
Figure 10 is a section on the line A—B of Figure 9 looking in the direction of the arrows.

The shoes may also be used for brakes in which the wedge block 5 is omitted, in which case a portion of the member 3 is cut away so as to accommodate the head 8 of the bolt 7, as shown in Figure 10.

In order to provide for sufficient support for the bearing surfaces 11, these are formed by cutting a rectangular portion from the rib 19 and then bending the shoe so that the remaining portions of the rib near the end of the shoe will abut along the line 20 as shown in Figure 1. The end 11 of the shoe may also be bent back as shown in Figure 9 after removing a corresponding portion of the rib 19 when its outer end is unsupported.

In order that the shoes 2 with their projecting end pieces may be conveniently accommodated in the brake drum 1, they are preferably formed with inwardly bent straight portions as shown at 23. The shoes are bent outwardly as shown at 22 in order to bring the surface 11 correctly over the cam 12.

Having thus described our invention what we claim as new and desire to secure by Letters Patent is:

1. A brake shoe for use in drum brakes, comprising a curved member with a central rib on its inner side, said central rib being cut away near one end of the curved member so as to form a central radial bearing surface, whilst the adjacent end of the curved member is bent radially inwards and bears along the centre thereof against the said radial bearing surface, and a bearing member at the other end of the curved member substantially as specified.

2. A brake shoe for use in drum brakes, comprising a curved member of T-section having a centrally disposed radial flat bearing surface at one end thereof, said bearing surface being formed by removing a substantially trapezoidal portion of the rib of the T-section member near the end thereof so as to form a substantially radial supporting surface on the rib extending centrally from the flange, and bending the end of the flange of the T-section member substantially radially inwards so that the supporting surface of the rib bears centrally against the inner surface of the radially bent portion of the flange, whilst the inner circumference of the central rib bears against a central trapezoidal rib portion of the radially bent portion of the flange, and a bearing member attached to the other end of the curved member.

RICHARD STEPHENS.
RICHARD JOHN STEPHENS.
ARTHUR EWART STEPHENS.